(12) United States Patent
Uchiyama et al.

(10) Patent No.: US 7,777,445 B2
(45) Date of Patent: Aug. 17, 2010

(54) ELECTRONIC APPARATUS, AND METHOD OF CHARGING A REMOTE CONTROL DEVICE

(75) Inventors: Takuya Uchiyama, Shinagawa (JP); Satoshi Sakurai, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 16 days.

(21) Appl. No.: 12/153,437

(22) Filed: May 19, 2008

(65) Prior Publication Data

US 2009/0146605 A1 Jun. 11, 2009

(30) Foreign Application Priority Data

Dec. 6, 2007 (JP) .............................. 2007-316265

(51) Int. Cl.
*H01M 10/44* (2006.01)
*H01M 10/46* (2006.01)
(52) U.S. Cl. ...................... 320/101; 320/103; 320/114; 320/115
(58) Field of Classification Search ................. 320/101, 320/103, 107, 114, 115; 340/539.14, 539.15
See application file for complete search history.

(56) References Cited

U.S. PATENT DOCUMENTS

| | | | |
|---|---|---|---|
| 6,445,290 B1 * | 9/2002 | Fingal et al. ............ | 340/539.32 |
| 6,879,254 B1 * | 4/2005 | Graham ................. | 340/539.32 |
| 7,280,351 B2 * | 10/2007 | Rankins et al. ......... | 361/679.55 |
| 7,576,645 B1 * | 8/2009 | Lugerner et al. ....... | 340/539.32 |
| 2006/0055372 A1 * | 3/2006 | Jackson ................... | 320/114 |
| 2008/0278894 A1 * | 11/2008 | Chen et al. ............... | 361/681 |

FOREIGN PATENT DOCUMENTS

| | | | |
|---|---|---|---|
| JP | 2-216692 | | 8/1990 |
| JP | 2004-312991 | | 11/2004 |
| JP | 2006006025 A | * | 1/2006 |
| JP | 2007-42895 | | 2/2007 |

OTHER PUBLICATIONS

Machine Translation for JP 2006006025 A.*

* cited by examiner

*Primary Examiner*—Edward Tso
*Assistant Examiner*—Ramy Ramadan
(74) *Attorney, Agent, or Firm*—Staas & Halsey LLP

(57) ABSTRACT

An electronic apparatus comprises an electronic apparatus main body and a remote control device for operating the electronic apparatus main body via wireless communications. The remote control device includes a device battery providing drive power supply to the remote control device. The electronic apparatus main body includes a main body battery. Excess energy, such as heat, generated when the electronic apparatus main body is driven is converted into electric power. A charge control circuit causes the main body battery to be charged with the electric power produced from the excess energy. When the remote control device is housed in the container unit, the charge control circuit causes the device battery to be charged by the main body battery. The remote control device can be reliably and easily charged, and the remote control device and the electronic apparatus main body can be easily managed.

6 Claims, 8 Drawing Sheets

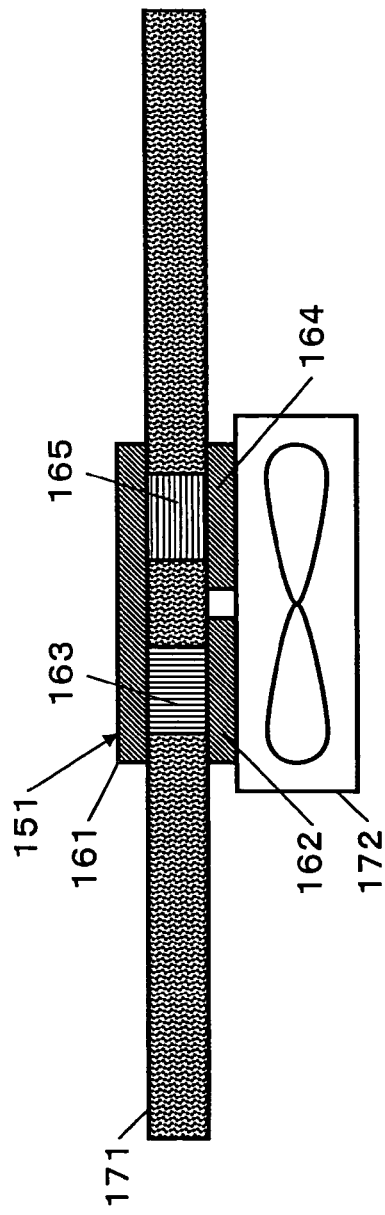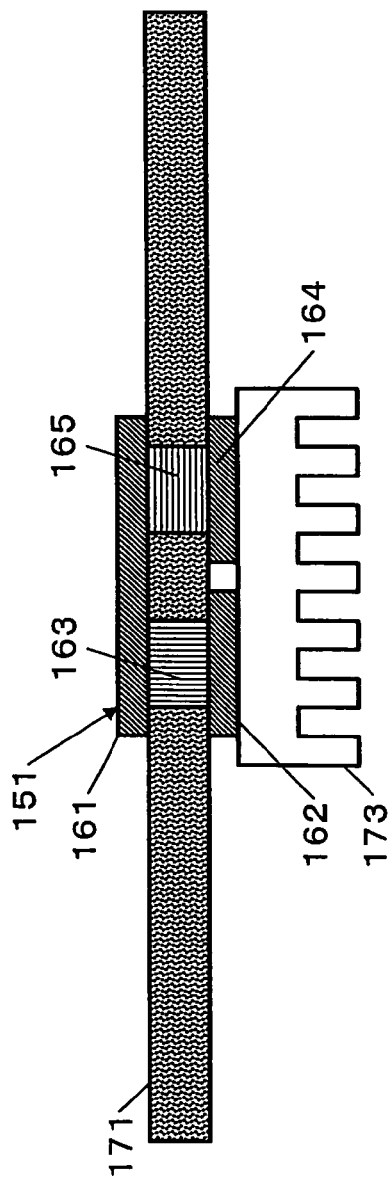

ELECTRONIC APPARATUS, AND METHOD OF CHARGING A REMOTE CONTROL DEVICE

BACKGROUND OF THE INVENTION

1. Field of the Invention

The present invention relates to electronic apparatuses and methods of charging remote control devices. In particular, the present invention relates to an electronic apparatus including an electronic apparatus main body and a remote control device for controlling the electronic apparatus main body via wireless communication, and to a method of charging the remote control device.

2. Description of the Related Art

In recent years, classes or presentations are more and more frequently conducted using a projector. In a typical class or presentation setup, the projector main body is positioned opposite a screen, with an operator standing beside the screen making comments or remarks. This means that the apparatus main body is usually located away from the operator, resulting in the need to use a remote control device (which may be referred to as a "remote controller").

Some of the latest remote controllers are equipped with a laser pointer. The method of communications between the remote controller and the apparatus main body is transitioning from infrared communications to radio communications. As a result, power consumption by the remote controller is increasing, when there is always the demand to reduce power consumption. The dry cells as the power supply for the remote controller are also increasingly being supplanted by rechargeable cells.

Projectors generate large amounts of heat from their light sources. In conventional projectors, such emitted heat has been dissipated to the outside. Desirably, such wasted heat should be utilized for some purpose from the viewpoint of reducing power consumption.

Japanese Laid-Open Patent Application No. 2004-312991 discloses a thermal generation apparatus for effectively utilizing the heat generated by a lamp by converting it into electric power. Japanese Laid-Open Patent Application No. 2007-42895 proposes a thermoelectric conversion apparatus for converting heat generated by a terminal device, such as a cellular phone, a personal data assistant (PDA), a remote controller, a notebook personal computer, or a projector, into electricity for efficient utilization of the heat. Japanese Laid-Open Patent Application No. 02-216692 discloses a video tape recorder (VTR) in which a VTR remote controller is adapted to be housed within a container portion of the apparatus main body in order to charge the remote controller with electric power supplied from an apparatus main body power supply.

However, no matter how efficiently such exhaust heat is utilized, not much electric power can be expected. For example, it is impossible to directly drive a projector with electric power generated from the exhaust heat. Thus, a method capable of effectively utilizing exhaust heat is desirable.

In the aforementioned Japanese Laid-Open Patent Applications No. 2004-312991 and No. 2007-42895, although the heat generated by the terminal device, such as a cellular phone, a PDA, a remote controller, a notebook personal computer, or a projector, is converted into electric power and used by each terminal device, the methods of utilization are not very effective.

The aforementioned Japanese Laid-Open Patent Application No. 02-216692 merely teaches putting the remote controller in the container portion of the apparatus main body in order to charge the controller, and does not contribute to reducing electric power consumption.

SUMMARY OF THE INVENTION

It is a general object of the present invention to provide a novel and useful electronic apparatus and method in which the above-mentioned problems are eliminated.

A more specific object of the present invention is to provide an electronic apparatus and a method of charging a remote control device whereby a remote control device can be charged reliably and easily, and whereby the remote control device and the electronic apparatus main body can be managed easily.

In one aspect, the present invention provides an electronic apparatus comprising an electronic apparatus main body; and a remote control device configured to wirelessly communicate with the electronic apparatus main body in order to operate the electronic apparatus main body. The remote control device includes a device battery that supplies drive power. The electronic apparatus main body includes a main body battery; a container unit configured to house the remote control device; a converter unit configured to convert excess energy generated when the electronic apparatus main body is driven into electric power; and a charge control circuit configured to cause the main body battery to be charged with the electric power produced by the converter unit. The charge control circuit is also configured to cause the device battery to be charged by the main body battery when the remote control device is housed in the container unit.

In a preferred embodiment, the converter unit is configured to convert heat generated when the apparatus main body is driven into an electric current.

In another preferred embodiment, the electronic apparatus main body includes a projector having a light source, and the converter unit is configured to convert heat generated by the light source into electric power.

In another aspect, the present invention provides a method of charging a remote control device configured to wirelessly communicate with an electronic apparatus main body of an electronic apparatus in order to operate the electronic apparatus main body. The remote control device includes a device battery which supplies drive power. The electronic apparatus main body includes a main body battery, a container unit configured to house the remote control device, and a converter unit configured to convert excess energy generated when the electronic apparatus main body is driven into electric power. The method comprises charging the main body battery with the electric power produced by the converter unit; and charging the device battery by the main body battery when the remote control device is housed in the container unit.

Thus, in accordance with an embodiment of the present invention, when the remote control device is housed in the container unit of the electronic apparatus main body, the device battery of the remote control device is charged by the battery in the electronic apparatus main body. Thus, the remote control device can be charged without connecting the main body apparatus to a power supply. Because the remote control device is housed in the container unit of the electronic apparatus main body, the need to manage the remote control device and the electronic apparatus main body separately can be eliminated, thus facilitating the management of the apparatus.

BRIEF DESCRIPTION OF THE DRAWINGS

These and other objects, features and advantages of the invention will be apparent to those skilled in the art from the following detailed description of the invention, when read in conjunction with the accompanying drawings in which:

FIG. 4A illustrates a surface-mounting method for the thermoelectric conversion element;

FIG. 4B illustrates another surface-mounting method for the thermoelectric conversion element;

DETAILED DESCRIPTION OF THE PREFERRED EMBODIMENTS

The present invention is described with reference to a projector as an example of an electronic apparatus according to an embodiment of the present invention, with reference made to the attached drawings.

Figure 1:
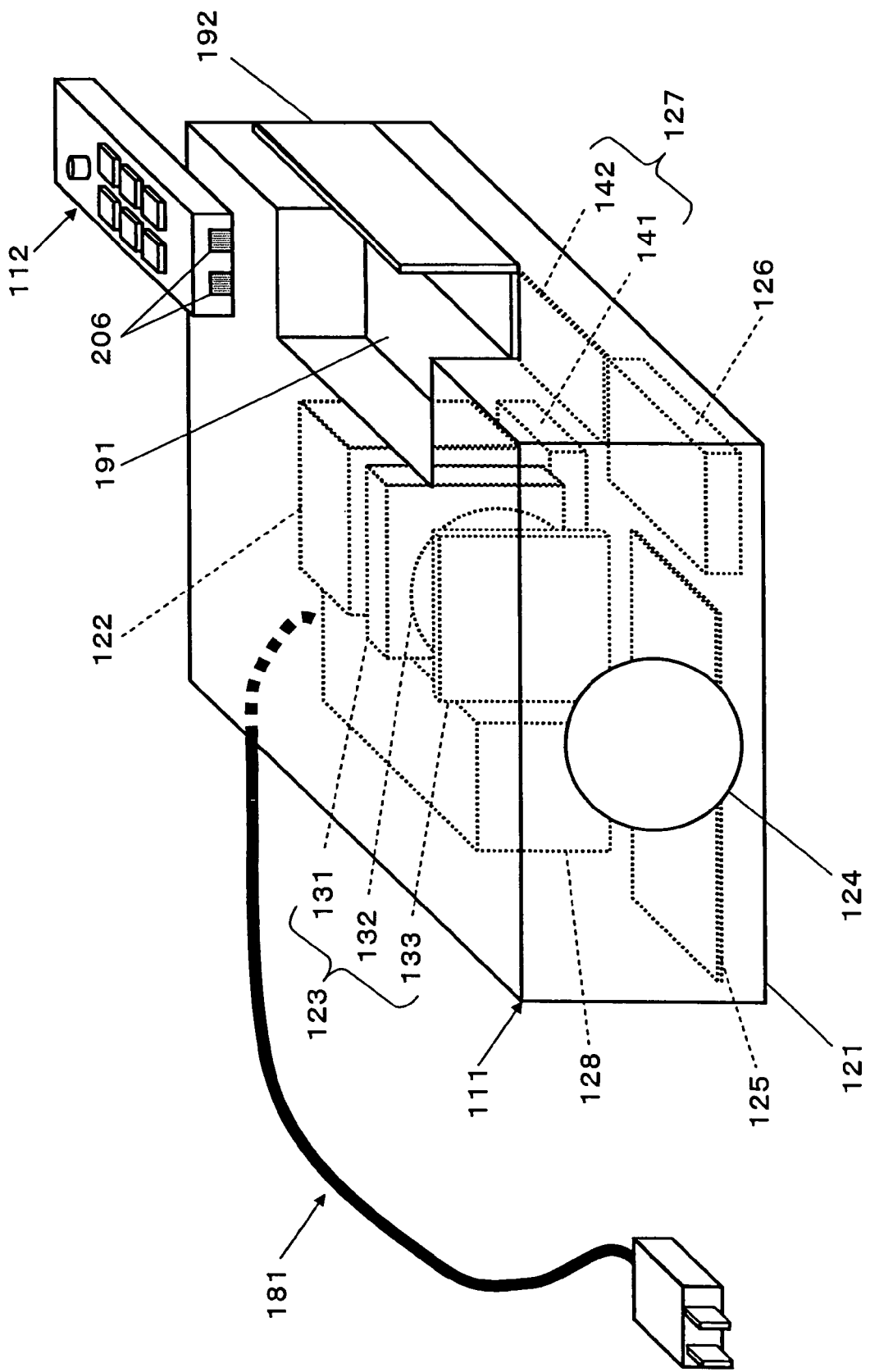
FIG. 1 shows an electronic apparatus according to an embodiment of the present invention.

FIG. 1 schematically shows a projector 100 according to the present embodiment. The projector 100, which is a single-panel type liquid-crystal projector, includes an apparatus main body 111 and a remote controller 112. The apparatus main body 111 is configured such that the remote controller 112 can be housed therein. In the apparatus main body 111, heat generated during operation is converted into electric power which is stored in a built-in secondary battery. After use, the remote controller 112 may be housed in the apparatus main body 111 in order to charge the secondary battery in the remote controller 112 with the electric power stored in the built-in secondary battery of the apparatus main body 111.

Figure 2:
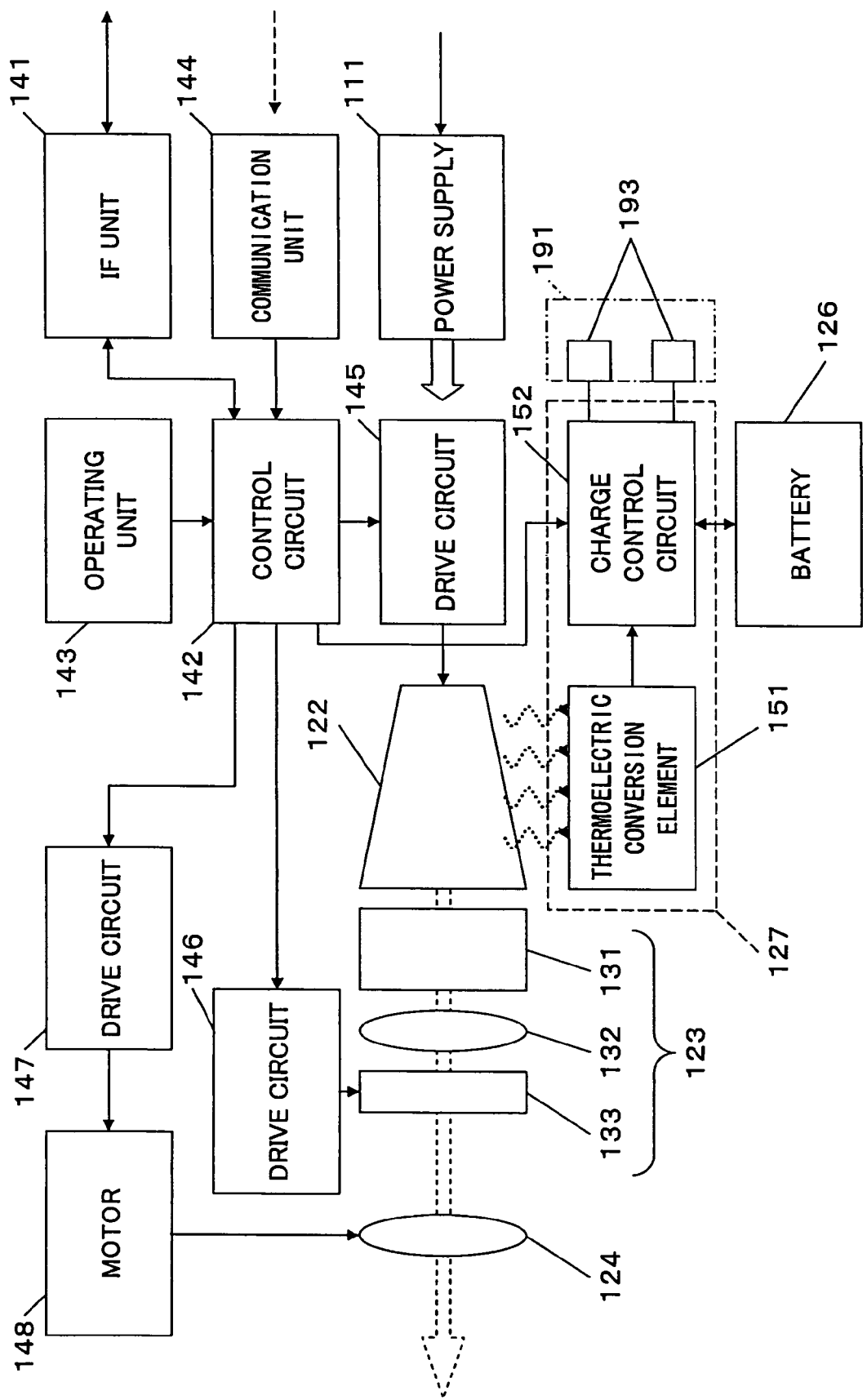
FIG. 2 shows a block diagram of an apparatus main body of the electronic apparatus shown in FIG. 1.

In the following, the apparatus main body 111 is described with reference to a block diagram shown in FIG. 2.

The apparatus main body 111 includes a casing 121 containing a lamp 122, an optical system 123, a projector lens 124, a control unit 125, a secondary battery 126, a charging unit 127, and a power supply unit 128.

The lamp 122, which may consist of an ultrahigh pressure mercury lamp, is driven by the control unit 125 to emit light including red, green, and blue (RGB) components. The light emitted by the lamp 122 is sent to the optical system 123.

The optical system 123 includes an integrator 131, a condensing lens 132, and a liquid crystal panel 133. The integrator 131 is configured to make the light from the lamp 122 uniform before the light is sent to the condensing lens 132, by which the light is condensed at the liquid crystal panel 133.

The liquid crystal panel 133, which may consist of a color liquid crystal panel, is driven by the control unit 125 to display an image corresponding to an image to be projected. The light from the condensing lens 132 is transmitted by the liquid crystal panel 133 and is then incident on the projector lens 124, by which the light is projected onto a screen.

The control circuit unit 125 includes an interface unit 141, a control circuit 142, an operating unit 143, a communication unit 144, drive circuits 145 through 147, and a motor 148. The interface unit 141 provides an interface for receiving an image signal from an external video apparatus, for example. The image signal obtained via the interface unit 141 is supplied to the control circuit 142.

The control circuit 142, which may include a central processing unit (CPU), controls the drive circuit 146 based on the image signal obtained via the interface unit 141, whereby the liquid crystal panel 133 is driven and the desired image is displayed on the liquid crystal panel 133. The control circuit 142 also exerts various controls in accordance with an operation entered via the operating unit 143, which may include key switches.

The communication unit 144 is configured to communicate with the remote controller 112 via a wireless communications technology, such as an infrared or a radio communications technology, so that an operation performed on the remote controller 112 can be communicated to the control circuit 142. The control circuit 142 exerts various controls in accordance with operations or instructions conveyed from the remote controller 112 via the communication unit 144.

The drive circuit 145 is supplied with a luminance control signal from the control circuit 142, and drives the lamp 122 in accordance with the luminance control signal. Thus, the luminance of the lamp 122 is controlled by the luminance control signal from the control circuit 142.

The drive circuit 146 is supplied with an image signal from the control circuit 142 and drives the liquid crystal panel 133 such that an image corresponding to the image signal from the control circuit 142 can be displayed on the liquid crystal panel 133.

The drive circuit 147 is supplied with a focus control signal from the control circuit 142, and drives the motor 148 in accordance with the focus control signal, whereby the position of the projector lens 124 is controlled. Thus, the focus of the image projected on the screen is controlled.

The secondary battery 126 may consist of a lithium ion battery, a nickel hydride battery, or a nickel-cadmium battery. The secondary battery 126 is charged by the charging unit 127 when the apparatus main body 111 is driven.

The charging unit 127 includes a thermoelectric conversion element 151 and a charge control circuit 152. The thermoelectric conversion element 151 is configured to convert heat into electric power based on the Seebeck effect. The thermoelectric conversion element 151 may consist of two different types of metals or semiconductors joined together, where temperature differences are caused at the ends of the element in order to produce an electromotive force.

Figure 3:
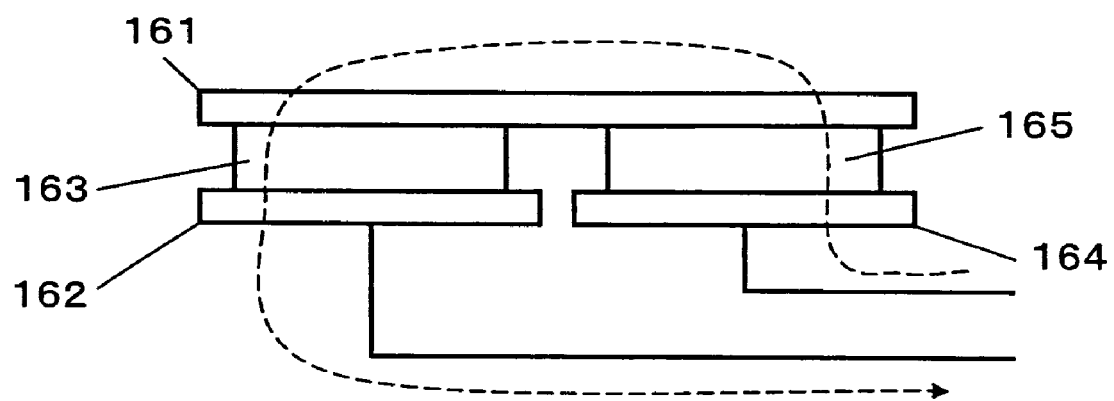
FIG. 3 shows a structure of a thermoelectric conversion element.

FIG. 3 shows a structure of the thermoelectric conversion element 151.

As shown, the thermoelectric conversion element 151 includes a p-type semiconductor 163 disposed between a conductor 161 and a conductor 162, and an n-type semiconductor 165 disposed between the conductor 161 and a conductor 164. When a high temperature is applied to the conductor 161 and a low temperature is applied to the conductors 162 and 164, the thermoelectric conversion element 151 generates an electromotive force, causing an electric current to flow as indicated by the broken-line arrow shown in FIG. 3.

FIG. 4A illustrates a surface-mounting method for the thermoelectric conversion element 151. FIG. 4B illustrates another surface-mounting method for the thermoelectric conversion element 151.

In the example shown in FIG. 4A, the conductor 161 is disposed on an upper surface of a heat insulating material 171, while the conductors 162 and 164 are disposed on a lower surface of the heat insulating material 171. The heat insulating material 171 is disposed with its upper side located opposite the lamp 122 and its lower side located opposite a bottom surface of the casing 121. An air-cooling fan 172 is attached under the conductors 162 and 164 for cooling purposes.

In this structure, the conductor 161 is exposed to a high temperature while the conductors 162 and 164 are exposed to a low temperature. As the conductors 162 and 164 are cooled by the air-cooling fan 172, the thermoelectric conversion efficiency can be improved.

Alternatively, a heat sink 173 may be attached to the conductors 162 and 164 instead of the air-cooling fan 172, as shown in FIG. 4B. Although the heat sink 173 is inferior to the air-cooling fan 172 in cooling capacity, it does not require a drive electric power supply and leads to a decrease in electric power consumption.

To the power supply unit 128, AC electric power is supplied via a power supply cable 181 during the operation of the apparatus main body 111, i.e., when the apparatus main body 111 is turned on. The power supply unit 128 converts the AC electric power supplied via the power supply cable 181 into DC electric power, which is voltage-converted and supplied to various parts as drive power supply.

The charge control circuit 152, which may include a CPU and a charge control integrated circuit (IC), is configured to control the charging of the secondary battery 126 by the thermoelectric conversion element 151. The charge control circuit 152 is also configured to control the charging of the remote controller 112 by the secondary battery 126. The charge control circuit 152 is driven by using the secondary battery 126 as a drive power supply.

The casing 111 includes a hollow container portion 191. The container portion 191 is open to the outside of the casing 111 so that the remote controller 112 can be housed therein from the outside. The hollow of the container portion 191 can be closed by a cover 192. On the inner surface of the container portion 191, terminals 193 are provided in a protruding manner for connection with the remote controller 112.

Figure 5:
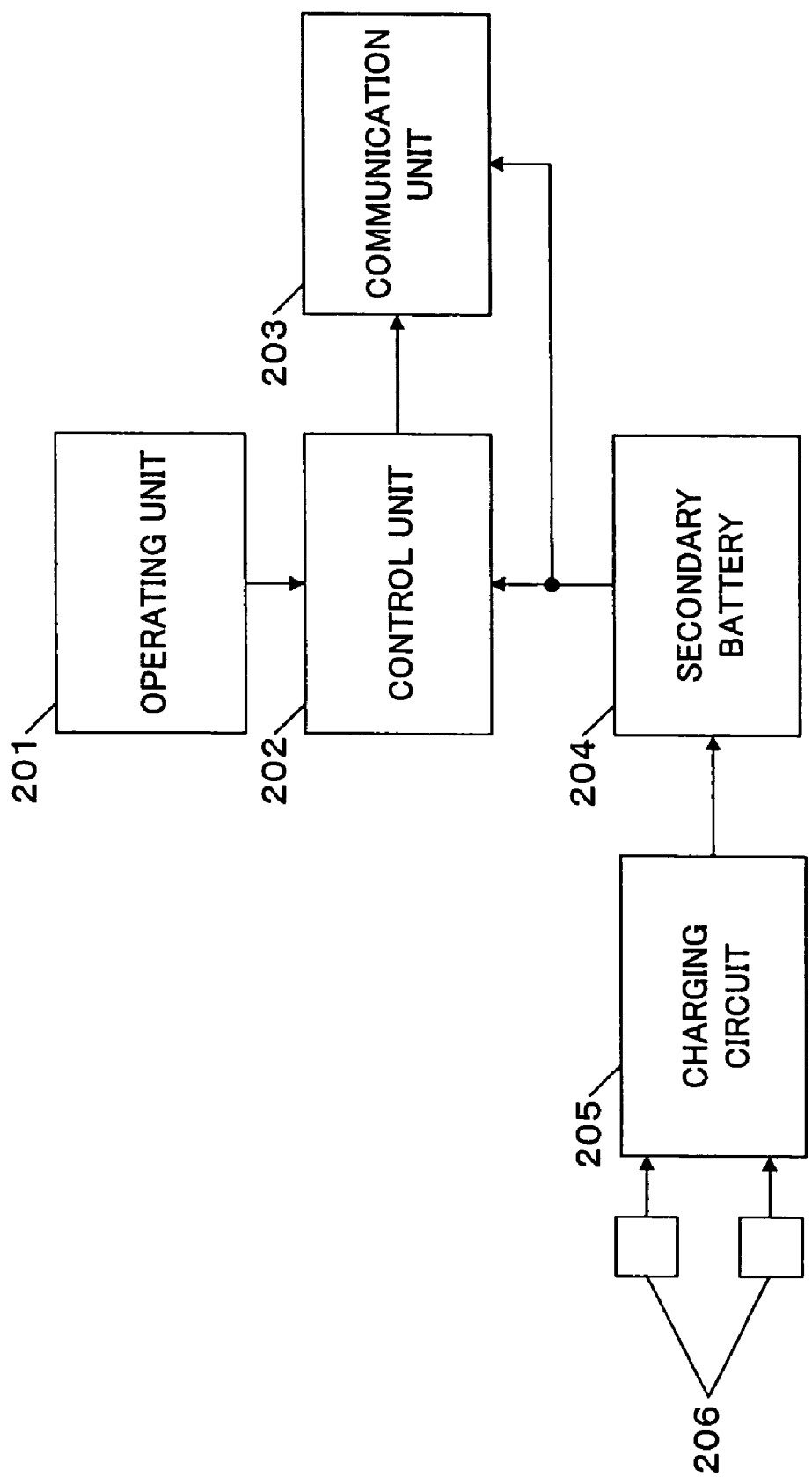
FIG. 5 shows a block diagram of a remote controller of the electronic apparatus shown in FIG. 1.

In the following, a structure of the remote controller 112 is described with reference to a block diagram shown in FIG. 5.

The remote controller 112 includes an operating unit 201, a control circuit 202, a communication unit 203, a secondary battery 204, a charging circuit 205, and terminals 206.

The operating unit 201, which may include key switches, is connected to the control circuit 202. The control circuit 202, which may include a CPU, generates operation data in accordance with an operation performed via the operating unit 201 and supplies the operation data to the communication unit 203.

The communication unit 203 transmits the operation data supplied from the control circuit 202 to the apparatus main body 111 using a wireless communications technology corresponding to that of the apparatus main body 111, such as an infrared or a radio communications technology.

The secondary battery 204, which may consist of a lithium ion battery, a nickel hydride battery, or a nickel-cadmium battery, is used as drive power supply for the control circuit 202 and the communication unit 203. The secondary battery 204 is charged by the charging circuit 205. In the present embodiment, the secondary battery 204 is connected to the terminals 206 via the charging circuit 205. In another embodiment, the secondary battery 204 may be directly connected to the terminals 206.

The charging circuit 205 charges the secondary battery 204 with the electric power supplied via the terminals 206.

The terminals 206 of the remote controller 112 is configured to be connected with the terminals 193 exposed on the inner surface of the container portion 191 when the remote controller 112 is placed within the container portion 191, whereby electric power can be supplied to the remote controller 112 via the terminals 193.

In the following, a structure of the container portion 191 for the remote controller 112 is described.

Figure 6A:
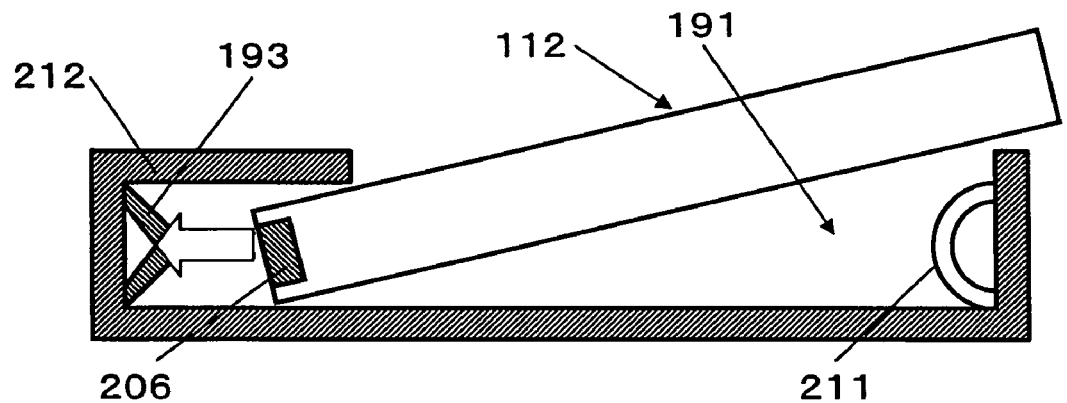
FIG. 6A shows a container structure of a container portion of the electronic apparatus main body for the remote controller, before the remote controller is housed therein.
Figure 6B:
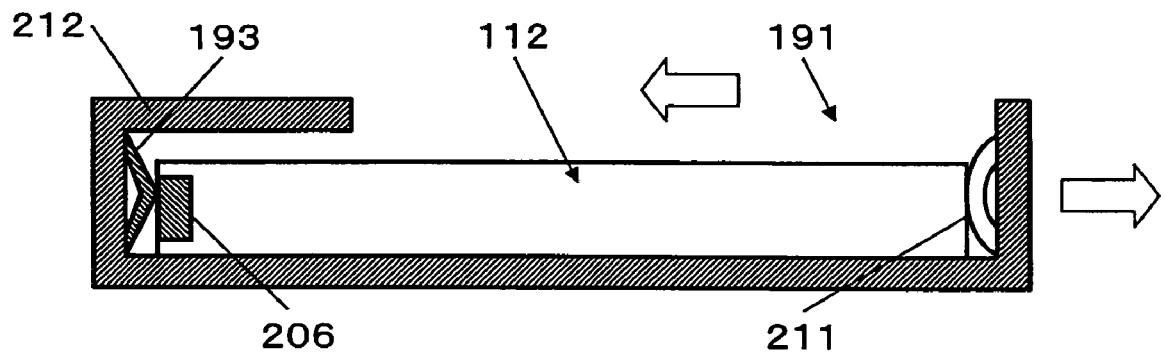
FIG. 6B shows the container structure shown in FIG. 6A after the remote controller is housed in the container portion.

FIGS. 6A and 6B illustrate the container structure of the container portion 191 for the remote controller 112 according to the present embodiment.

FIG. 6A shows the container portion 191 before the remote controller 112 is placed in it. FIG. 6B shows the container portion 191 in which the remote controller 112 is placed.

In the container structure shown in FIGS. 6A and 6B, the terminals 206 are provided on one side of the remote controller 112, while the terminals 193 are provided on an inner surface of the container portion 191. When the remote controller 112 is housed in the container portion 191, the terminals 206 of the remote controller 191 are pressed against the terminals 193 and come into contact therewith. Thus, the terminals 206 of the remote controller 112 are connected with the terminals 193 of the apparatus main body 111, allowing the remote controller 112 to be charged. The remote controller 112 is retained in the container portion 191 reliably by the pressing force provided by the spring 211. Furthermore, a flange portion 212 is provided on the side of the terminals 193 of the container portion 191, which prevents the remote controller 112 to be inadvertently detached from the container portion 191.

The terminals 206 may be provided on the bottom surface of the remote controller 112.

Figure 7A:
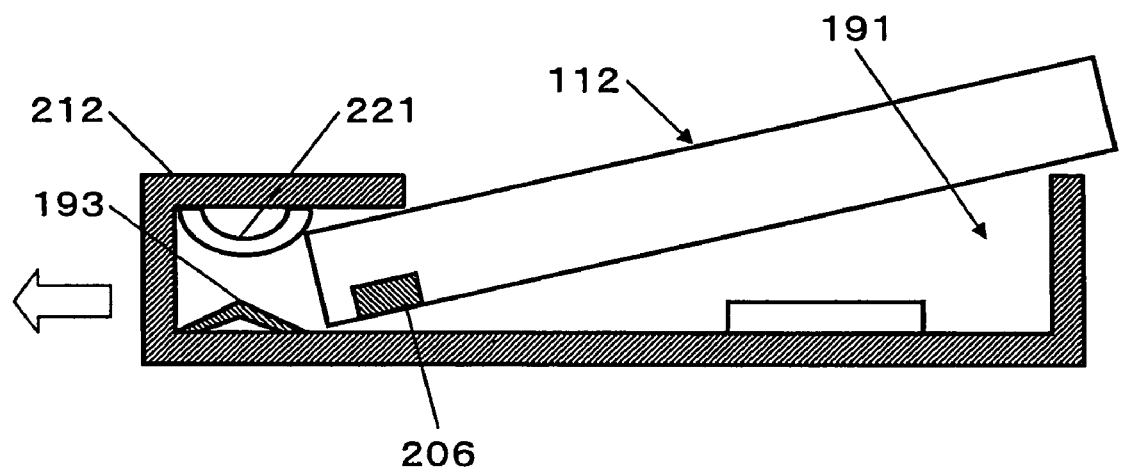
FIG. 7A shows another container structure of the container portion for the remote controller before the remote controller is housed therein.
Figure 7B:
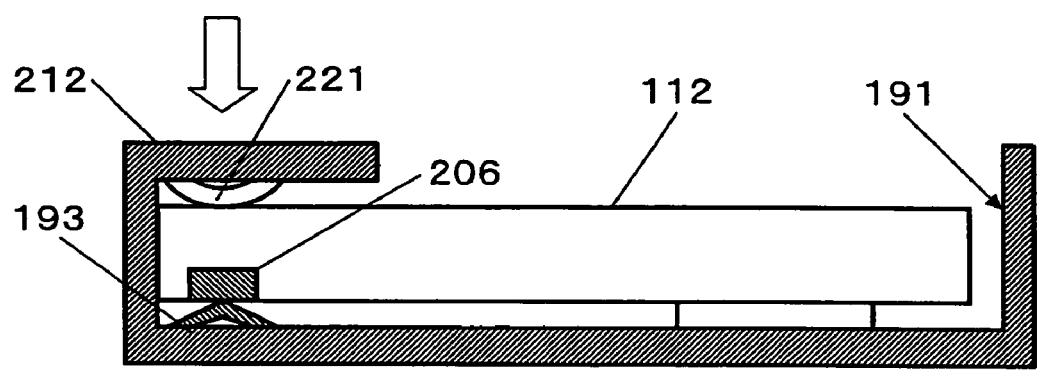
FIG. 7B shows the container structure shown in FIG. 7A after the remote controller is housed in the container portion.

FIGS. 7A and 7B show another container structure of the container portion 191 of the remote controller 112. FIG. 7A shows the container portion 191 before the remote controller 112 is housed therein. FIG. 7B shows the container portion 191 with the remote controller 112 housed therein.

In this structure, the terminals 206 are provided on the bottom surface of the remote controller 112, and the terminals 193 are provided on the internal bottom surface of the container portion 191. A pressing spring 221 is provided on an internal surface of the flange portion 212.

When housed in the container portion 191, the remote controller 191 is pressed by the pressing spring 221 against the bottom surface of the container portion 191. Thus, the terminals 206 of the remote controller 112 are connected to the terminals 193 under pressure, and the remote controller 112 is securely retained within the container portion 191.

Figure 8:
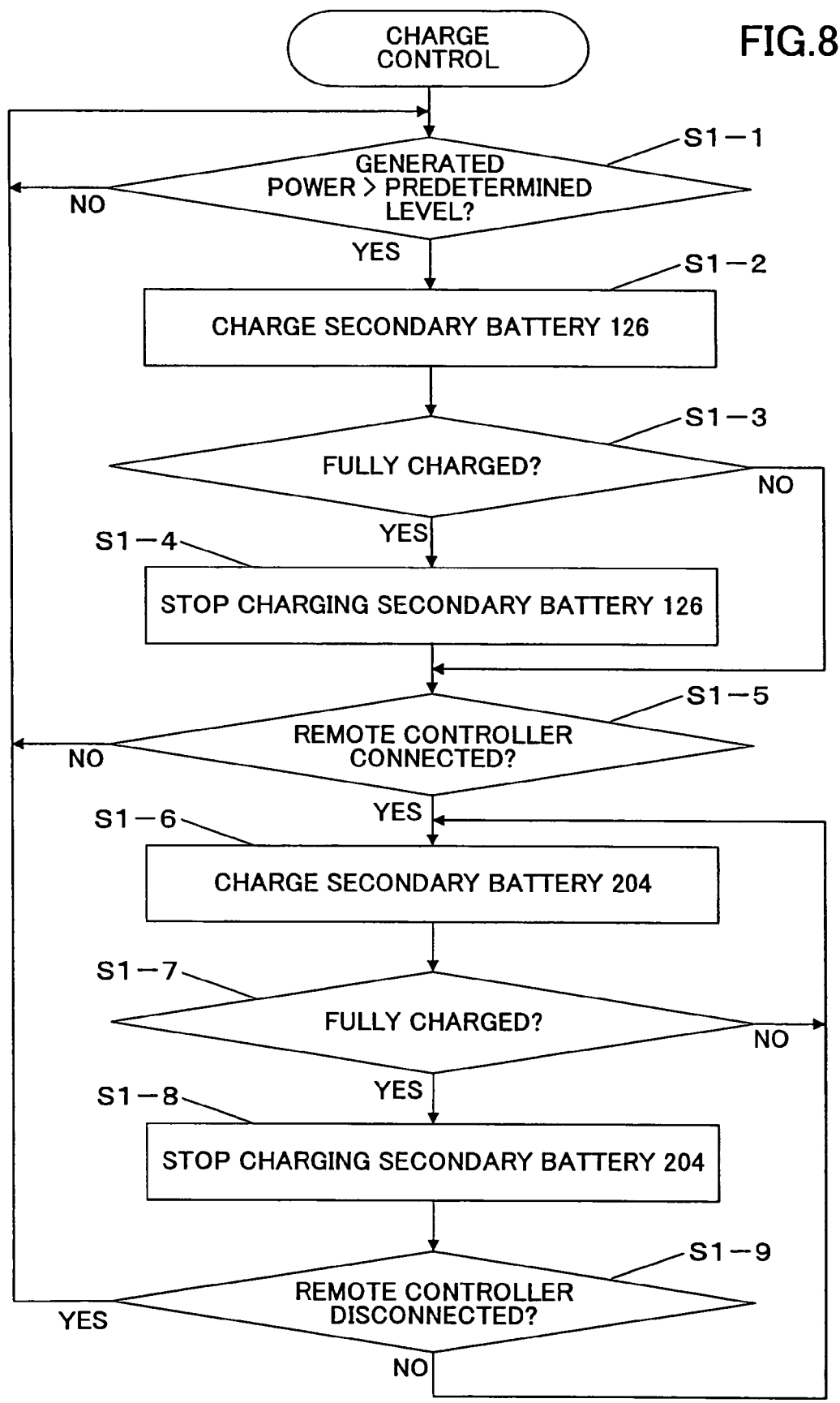
FIG. 8 shows a flowchart of a process performed by a charge control circuit.

In the following, an operation of the charge control circuit 152 is described with reference to a flowchart shown in FIG. 8.

As power supply is provided to the apparatus main body 111, the lamp 122 turns on and generates heat. This causes an electromotive force in the thermoelectric conversion element 151. As the heat from the lamp 122 increases and the electromotive force in the thermoelectric conversion element 151 reaches a certain level, the secondary battery 126 can be charged.

In step S1-1, the charge control circuit 152 detects the electric power generated by the thermoelectric conversion element 151, and determines whether or not the power has reached a predetermined value. If the predetermined value is reached, the secondary battery 126 is charged by the thermoelectric conversion element 151 in step S1-2.

In step S1-3, the charge control circuit 152 detects the voltage of the secondary battery 126 and determines whether the secondary battery 126 is fully charged. If the secondary battery 126 is fully charged, the charge control circuit 152 terminates the charging in step S1-4.

In step S1-5, the charge control circuit 152 determines whether the terminals 206 of the remote controller 112 are connected to the terminals 193 of the apparatus main body 111. This determination may be performed by detecting the voltage at the terminals 193. Specifically, when the remote controller 112 is housed in the container portion 191 and the terminals 206 of the remote controller 112 are connected to the terminals 193 of the apparatus main body 111, voltage is applied to the terminals 193 from the charging circuit 205, resulting in a potential change at the terminals 193.

Upon detection of connection of the terminals 206 of the remote controller 112 to the terminals 193 of the apparatus main body 111 in step S1-5, the charge control circuit 152 applies voltage to the terminals 193 from the secondary battery 126 of the apparatus main body 111, whereby voltage is applied to the terminals 206 of the remote controller 112.

In the remote controller 112, the charging circuit 205 charges the secondary battery 204 with the voltage applied to the terminals 206.

In step S1-7, the charge control circuit 152 detects the voltage at the terminals 193 to determine whether the secondary battery 204 of the remote controller 112 is fully charged. If the secondary battery 204 of the remote controller 112 is fully charged, the charge control circuit 152 terminates the supply of voltage to the terminals 193 in step S1-8, thus stopping the charging of the remote controller 112.

In step S1-9, the charge control circuit 152 detects the voltage at the terminals 193 to determine whether the connection between the terminals 193 and the terminals 206 of the remote controller 112 is severed. If the connection is severed, the charge control circuit 152 repeats the process from step S1-1.

As described above, the secondary battery 126 in the apparatus main body 111 is charged when the apparatus main body 111 is driven. After the apparatus main body 111 is used and when the remote controller 112 is housed in the container portion 191 of the apparatus main body 111, the secondary battery 204 in the remote controller 112 is charged by the built-in secondary battery 126 of the apparatus main body 111.

In this way, the heat that is generated by the lamp 122, which has heretofore been wasted as excess energy, is converted into electric power with which to charge the secondary battery 126. Thus, no electric power is consumed for charging the secondary battery 126 of the apparatus main body 111. Because the waste energy can be utilized, the remote controller 112 can be charged while saving electric power.

Because the remote controller 112 can be housed in the container portion 191 for storage after use of the apparatus main body 111, the need to manage the apparatus main body 111 and the remote controller 112 separately can be eliminated, thus facilitating the management of the apparatus.

While in the present embodiment the thermal energy generated by the lamp 122 is used as the excess energy with which to charge the secondary battery 126, this is merely an example. In another example, heat generated by the power supply unit 128 may be used instead of or in addition to the heat from the lamp 122. Also, leakage light from the lamp 122 or the optical system 123 may be converted into electric power by a photoelectric transducer and used to charge the secondary battery 126.

Although the invention has been described in detail with reference to certain embodiments, variations and modifications exist within the scope and spirit of the invention as described and defined in the following claims.

The present application is based on the Japanese Priority Application No. 2007-316265 filed Dec. 6, 2007, the entire contents of which are hereby incorporated by reference.

What is claimed is:

1. An electronic apparatus, comprising:
an electronic apparatus main body; and
a remote control device configured to wirelessly communicate with the electronic apparatus main body in order to operate the electronic apparatus main body;
wherein the remote control device includes a device battery that supplies drive power,
and the electronic apparatus main body includes:
a light source configured to emit light;
an optical system via which the light emitted by the light source is passed;
a projector lens configured to project the light from the optical system onto a screen disposed outside the electronic apparatus main body;
a main body battery;
a container unit configured to house the remote control device;
a converter unit configured to convert excess energy generated when the electronic apparatus main body is driven into electric power, the converter unit including a thermoelectric element configured to convert heat generated by the light source into electric power and a photoelectric transducer configured to convert leakage light from the light source or the optical system into electric power; and
a charge control circuit configured to cause the main body battery to be charged with the electric power produced by the converter unit, when the electric power exceeds a predetermined threshold, and configured to cause the device battery to be charged by the main body battery when the remote control device is housed in the container unit.

2. A method of charging a remote control device configured to wirelessly communicate with an electronic apparatus main body of an electronic apparatus in order to operate the electronic apparatus main body,
wherein the remote control device includes a device battery which supplies drive power, and
the electronic apparatus main body includes:
a light source configured to emit light;
an optical system via which the light emitted by the light source is passed;
a projector lens configured to project the light from the optical system onto a screen disposed outside the electronic apparatus main body;
a main body battery;
a container unit configured to house the remote control device; and
a converter unit configured to convert excess energy generated when the electronic apparatus main body is driven into electric power, the converter unit including a thermoelectric element configured to convert heat generated by the light source into electric power and a photoelectric transducer configured to convert leakage light from the light source or the optical system into electric power, the method comprising:

charging the main body battery with the electric power produced by the converter unit when the electric power exceeds a predetermined threshold; and charging the device battery by the main body battery when the remote control device is housed in the container unit.

3. The electronic apparatus according to claim 1, wherein the converter unit further includes a heatsink disposed on the thermoelectric element.

4. The electronic apparatus according to claim 1, wherein the converter unit further includes an air-cooling fan disposed on the thermoelectric element.

5. The electronic apparatus according to claim 1, wherein the container unit includes a spring configured to retain the remote control device in the container unit.

6. The electronic apparatus according to claim 1, wherein the container unit includes a flange configured to retain the remote control device in the container unit.

* * * * *